Oct. 12, 1954 — C. P. WEST — 2,691,562
METAL-ENCLOSED SWITCHGEAR
Filed Nov. 8, 1950 — 5 Sheets-Sheet 1

INVENTOR
Charles P. West.
BY
ATTORNEY

Oct. 12, 1954

C. P. WEST 2,691,562

METAL-ENCLOSED SWITCHGEAR

Filed Nov. 8, 1950

WITNESSES:
E. A. McCloskey
Nw. L. Groome

INVENTOR
Charles P. West.
BY
ATTORNEY

Oct. 12, 1954     C. P. WEST     2,691,562
METAL-ENCLOSED SWITCHGEAR
Filed Nov. 8, 1950     5 Sheets-Sheet 3

WITNESSES:
E. A. McCloskey
N. W. C. Groome

INVENTOR
Charles P. West.
BY
ATTORNEY

Oct. 12, 1954   C. P. WEST   2,691,562
METAL-ENCLOSED SWITCHGEAR
Filed Nov. 8, 1950   5 Sheets-Sheet 4

WITNESSES:
E. A. McCloskey
New L. Groove

INVENTOR
Charles P. West.
BY
ATTORNEY

Patented Oct. 12, 1954

2,691,562

UNITED STATES PATENT OFFICE 2,691,562

METAL-ENCLOSED SWITCHGEAR

Charles P. West, Pittsburgh, Pa., assignor to Westinghouse Electric Corporation, East Pittsburgh, Pa., a corporation of Pennsylvania Application November 8, 1950, Serial No. 194,597

6 Claims. (Cl. 312—100)

My invention relates, generally, to metal-enclosed switchgear and, more particularly, to metal-enclosed switchgear suitable for outdoor service.

An object of my invention, generally stated, is to provide a relatively low-voltage metal-enclosed switchgear unit which shall be simple and efficient in operation and which may be economically manufactured and installed.

A more specific object of my invention is to provide a relatively low voltage metal-enclosed switchgear unit which is suitable for outdoor service.

Another object of my invention is to provide for constructing outdoor metal-enclosed switchgear units of different sizes from a line of standard parts which may be stocked by a switchgear manufacturer.

A further object of my invention is to provide outdoor metal-enclosed switchgear units which may be assembled with any desired number of units joined together in side-by-side relation.

A still further object of my invention is to provide a self-supporting inner switchgear unit with an outer housng added thereto to make a weatherproof structure.

Still another object of my invention is to provide for readily increasing the number of units in a switchgear installation.

Other objects of my invention will be explained fully hereinafter or will be apparent to those skilled in the art.

In accordance with my invention, the main framework for a metal-enclosed switchgear unit is constructed from parts which may be carried in stock and are so formed that they may be readily assembled into a unit which is bolted to a suitable base. Door frames at the front and the rear of the unit which function as supports for the roof are provided from standard parts which are bolted to the main framework at each corner. Side sheets are attached to the corner members, thereby enclosing the unit to provide a weatherproof structure. Any desired number of units may be bolted together in side-by-side relation.

For a better understanding of the nature and objects of my invention, reference may be had to the following detailed description, taken in conjunction with the accompanying drawings, in which.

Figures 1, 2:
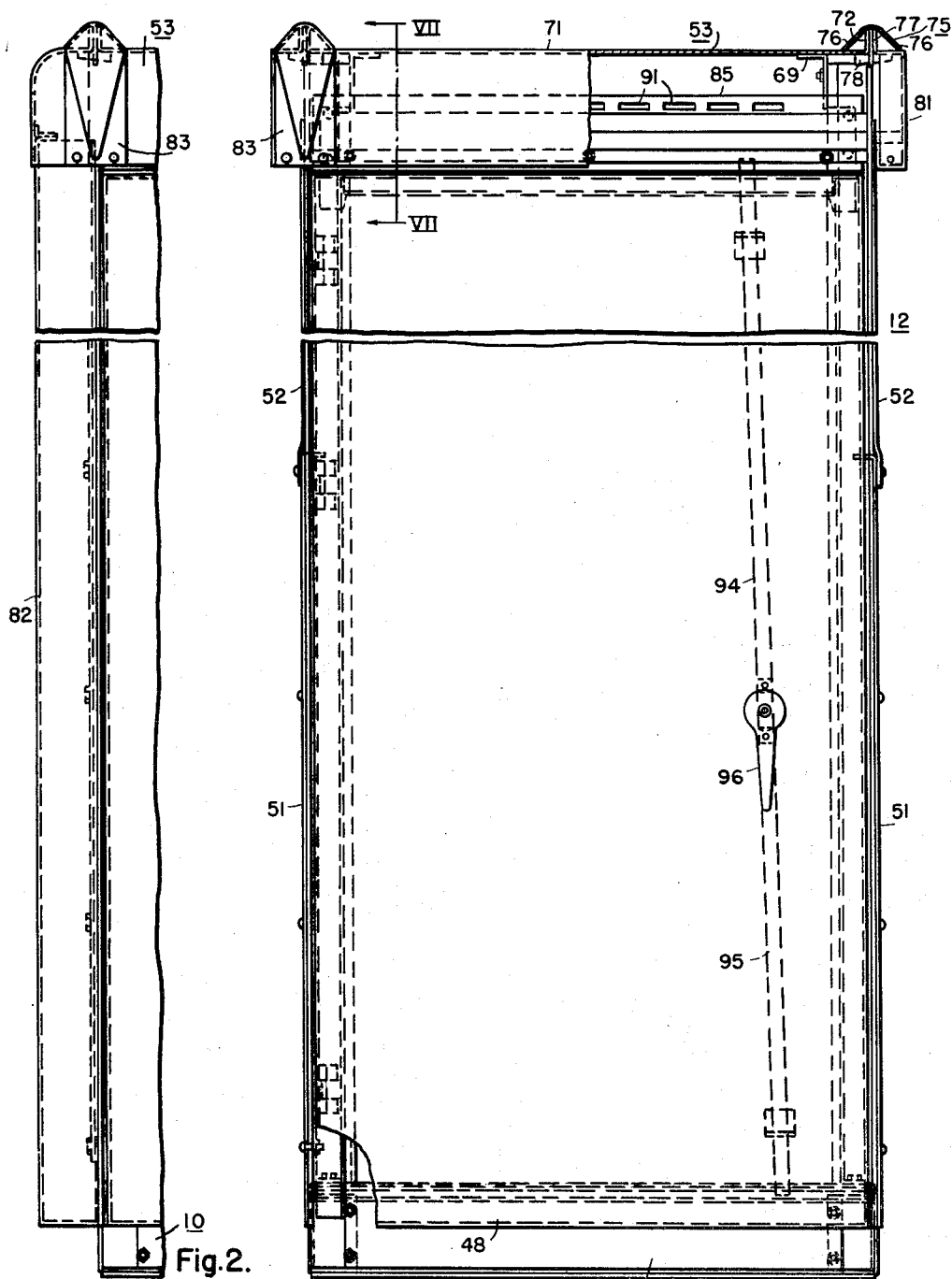
Figure 1 is a view, in front elevation, of a switchgear unit embodying the principal features of my invention, portions being broken away for clearness.
Fig. 2 is a view, in front elevation, of part of a switchgear unit with an end trim member added.
Figure 3:
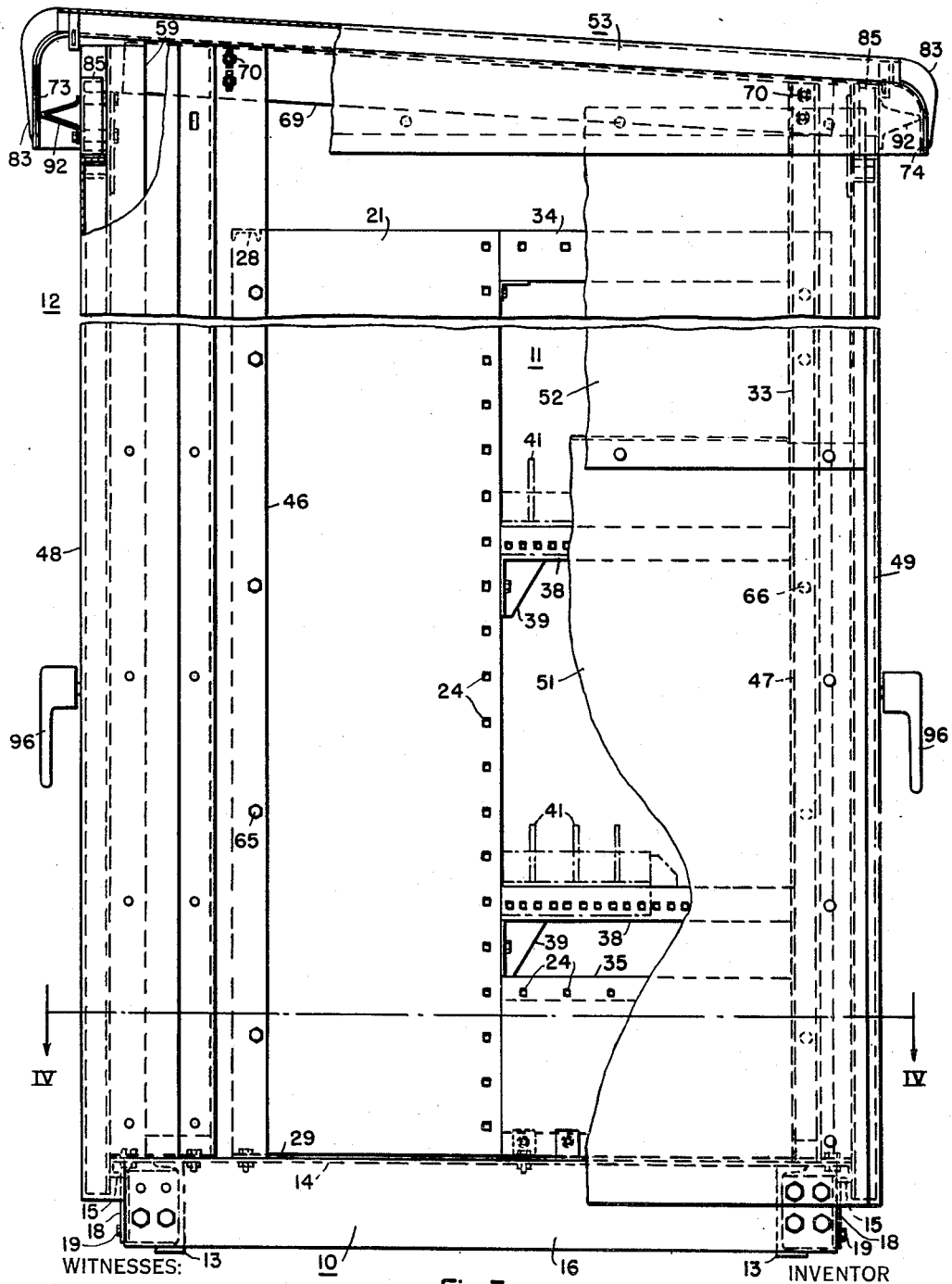
Fig. 3 is a view, in side elevation, of the switchgear unit, portions being broken away.

Referring to the drawings, and particularly to Figs. 1 and 3, the structure shown therein comprises a unitary metal base 10 upon which is mounted a main framework 11 which is enclosed by a metal housing 12. The base 10 comprises a pair of spaced channel members 13 upon which rests a base plate 14. The plate 14 has an inturned flange 15 at each end and a depending apron 16 at each side.

Figure 6:
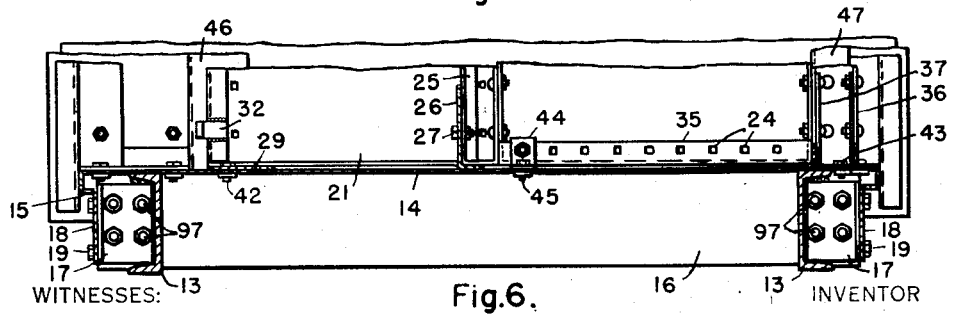
Fig. 6 is a view, in section, taken along the line VI—VI in Fig. 4, certain parts being removed for clarity.

As shown most clearly in Fig. 6, an angle member 17 may be welded to one of the channel members 13 at each corner of the rectangular base 10. A cover plate 18 may be attached to the angle members 17 at the front of the base by bolts 19.

A similar cover plate may be attached to the angle members 17 at the rear of the base.

The main framework 11 is preferably of the type disclosed in my Patent 2,424,345, issued July 22, 1947 and assigned to the same assignee as the present application. As shown most clearly in Fig. 4 the main framework may be divided into two sections, each section of which includes a front compartment for housing circuit breakers or similar apparatus and a rear compartment in which bus bars and other electrical apparatus may be mounted.

Each front compartment comprises a pair of vertical side plates 21 disposed in spaced relation. The two inside plates of adjacent sections may be joined together by bolts 22. Horizontal barriers may be provided between the side plates to provide a plurality of subcompartments at the front of each section for housing the circuit breakers and other apparatus (not shown).

Each side plate 21 is provided with an inturned edge 23 at the rear having a plurality of equally spaced openings, preferably square, provided therein. Similar openings 24 are provided in the side of each plate 21 in spaced relation as shown in Fig. 3.

An angle member 25 is secured on the inside of each side plate 21. As shown most clearly in Fig. 4, the angle members 25 are spaced a short distance from the inturned edges 23 and they extend the full length of the side plates. Each pair of side plates may be tied together at the rear by plates 26 which are bolted to the angle members 25 by bolts 27. The plates 26 also function as barriers to separate the breaker compartments from the bus compartment at the rear of the structure.

Each pair of side plates may be tied together at the front by a channel member 28 at the top and a flat bar 29 at the bottom of the structure. Hinged panels or doors 31 of the usual type may be provided for the breaker compartments. The doors 31 may be supported by hinges 32 attached to the side plates 21.

A rear or bus compartment may be formed at the rear of the front or breaker compartments by vertically placing a rectangular frame a predetermined distance from the rear edges of the side plates 21. The rectangular frame comprises vertically disposed channel members 33 which may be tied to the side plates 21 by horizontally disposed channel members 34 and 35 located at the top and the bottom, respectively, of the structure. The horizontal members 34 and 35 may be bolted to the inturned edges 23 of the side plates 21 and to the vertical members 33.

Figure 4:
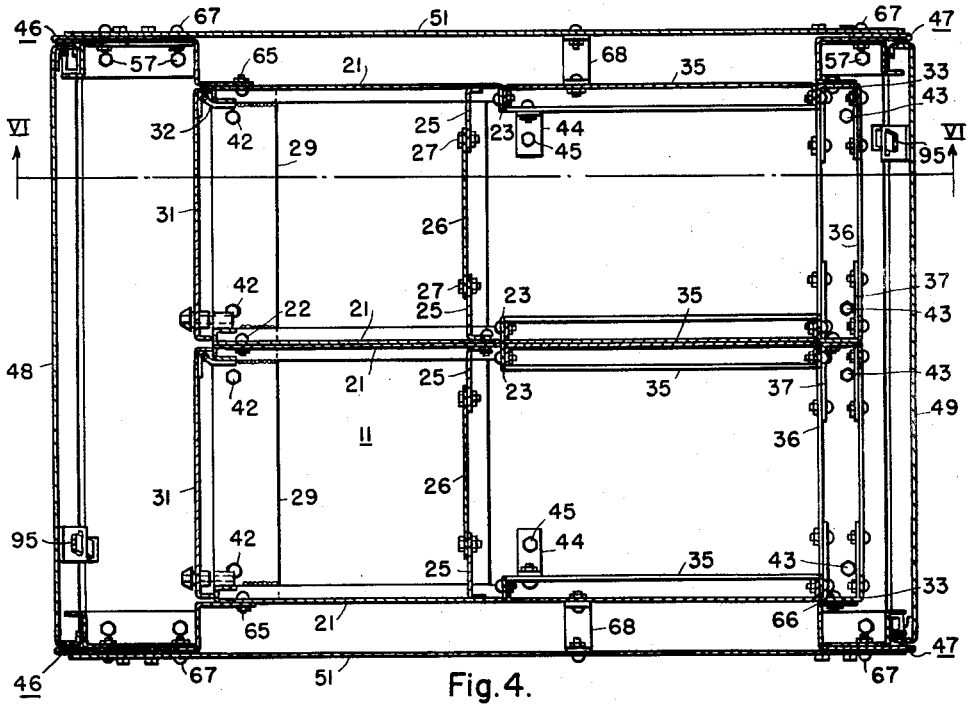
Fig. 4 is a view, in section, taken along the line IV—IV in Fig. 3.

The channel members 33, 34 and 35 are provided with a plurality of square openings 24 spaced similarly to those in the side plates 21. The vertical members 33 of the frame may be tied together by horizontally disposed channel members 36 located at the top and the bottom of the structure. The framework may be strengthened by providing corner braces 37 as shown in Fig. 4.

As shown most clearly in Fig. 3, channel members 38 may be horizontally disposed between the vertical members 33 and the side plates 21. The members 38 may be adjustably secured to the channel members 33 and the inturned edges 23 of the side plates 21 by brackets 39 which may be bolted in position at any desired height by utilizing the openings 24.

Bus bars 41 may be adjustably mounted on the channel members 38 in the manner described in my Patent 2,445,463, issued July 20, 1948. Thus, the bus bars 41 may be adjusted both vertically and horizontally to any desired position in the bus compartment.

Figure 5:
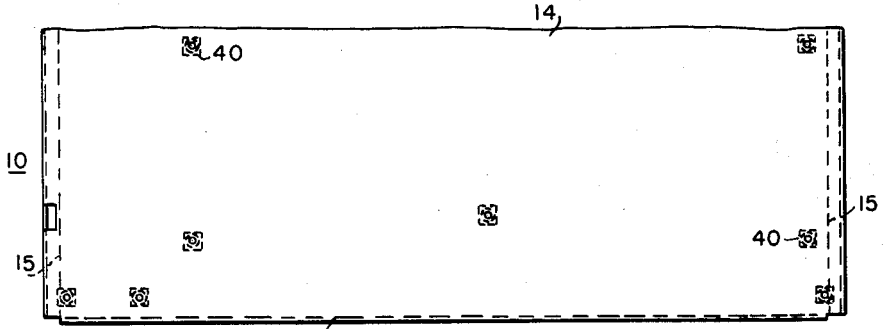
Fig. 5 is a view, in plan, of part of the base for supporting the unit.

The main framework 11 may be bolted to the base 10 by bolts 42 which extend through the plates 29, bolts 43 which extend through the channel members 36 into the base plate 14, and by brackets 44 which are attached to the channel members 35 and are bolted to the base plate 14 by bolts 45. As shown in Fig. 5, nuts 40 may be welded to the underside of the plate 14 for the bolts which extend through the plate.

As described in my aforesaid patents, the main framework 11 may be assembled in units of different dimensions from parts carried in stock. Furthermore, the main framework is self-supporting and is capable of supporting the weight of the apparatus mounted in the framework and withstanding the stresses imposed by current carried by the bus bars in the bus compartment.

In order to make the structure suitable for outdoor service, the housing 12 is provided for enclosing the main framework 11. The housing 12 comprises an upright member 46 disposed at each front corner of the base 10, an upright member 47 disposed at each rear corner of the base, a hinged door 48 at the front of the housing, a similar door 49 at the rear of the housing, side sheets 51 and 52, and a roof structure 53.

Figure 12:
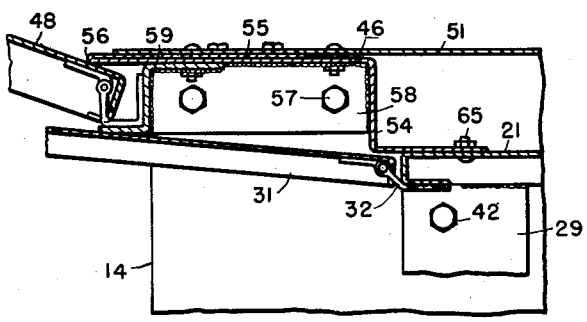
Fig. 12 is an enlarged detail view, in section, of a portion of the left front corner of the structure with the doors in the open position.

As shown most clearly in Fig. 12, each upright member 46 has an inwardly extending flange 54 which is bolted to the side plate 21, thereby offsetting the upright member from the side plate 21. In this manner the door 31 which is hinged to the side plate 21 is permitted to swing open through an angle greater than 90° when the door 48 is opened, thereby permitting the circuit breakers to be removed from the compartments in the main framework.

The upright member 46 has a doubled-back portion 55 which provides a rounded edge 56 at the front of the structure. The upright member may be bolted to the base plate 14 by bolts 57 which extend through an angle plate 58 welded to the upright member 46. A Z bar 59 is attached to the upright member 46, thereby providing a trough or gutter parallel to the upright member 46 for the flanged door 48.

Figure 13:
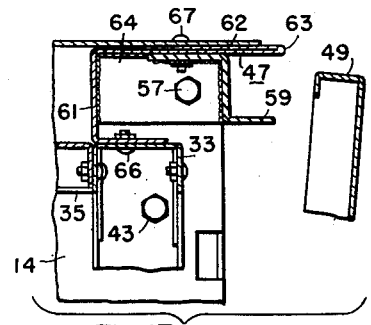
Fig. 13 is a view, similar to Fig. 12, of the left rear corner of the structure.

As shown in Fig. 13, each upright member 47 has an inwardly extending flange 61 which is attached to the channel member 33 of the main framework, thereby offsetting the upright member 47 from the framework the same distance as the upright member 46. The upright member 47 has a doubled-back portion 62 which provides a rounded edge 63 at the rear of the structure. The upright member may be bolted to the base 14 by bolts 57 which extend through an angle plate 64 welded to the upright member. A Z bar 59 is attached to the upright member 47 to provide a trough for the rear door 49.

The upright members 46 may be attached to the side plates 21 by bolts 65. Likewise, the upright members 47 may be attached to the channel members 33 by bolts 66. The side sheets 51 may be attached to the upright members by bolts 67. Spacing members 68 may be provided between the side sheets 51 and the channel members 35 to stiffen the side sheets 51.

As shown most clearly in Figs. 1 and 3, the upright members 46 and 47 extend above the main framework 11 to support the roof structure 53. The roof is supported by angle members 69 which may be attached to the upright members by bolts 70. The roof structure may be of the type described in the copending application of G. L. Claybourn et al., Serial No. 783,170, filed October 30, 1947, now Patent No. 2,615,775, issued October 28, 1952.

As shown, the roof structure comprises a metal roof sheet 71 for each housing unit. The sides of each roof sheet are bent at right angles to and upwardly from the roof surface to form upstanding flanges 72. As shown most clearly in Fig. 3, the ends of each roof sheet 71 extend beyond the unit enclosure at both the front and rear of the housing and are bent downwardly to provide drip edge extensions 73 and 74 at the front and the rear, respectively, of the housing. The roof sheet 71 may be held in place by spot welding it to the angle members 69.

As shown most clearly in Fig. 1, the seam between the flanges 72 on adjacent units may be sealed by an angle shaped metal plate 75 having legs 76 of equal length. The sealing plate 75 may be retained in position by tongue plates 77 which are secured to the sealing plate 75 and are disposed between the flanges 72. The tongue plates 77 extend below the bottom surface of the roof sheet 21 and are provided with slots through which wedges 78 are driven.

As shown in Fig. 1, an end trim 81 may be provided at either one or both ends of the housing unit when it is anticipated that additional units will be added to the switchgear installation. When an additional unit is added the end trim 81 may be removed, thereby permitting the additional unit to be joined to the unit already installed. If it is thought that no additional units will be added at one end of the original installation, an end trim 82 may be provided in place of the side sheets 51 and 52 as shown in Fig. 2. A baffle casting 83 may be provided at each end of the angle shaped sealing plates 75 to close the ends of the sealing plate.

Figure 7:
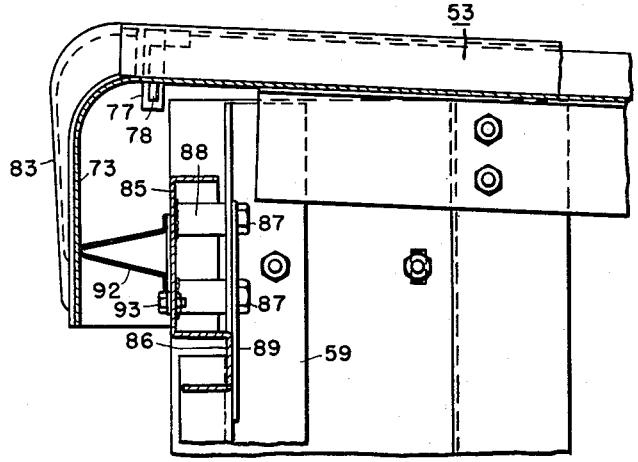
Fig. 7 is an enlarged detail view, partly in section and partly in elevation, of the upper left-hand front corner of the switchgear unit.
Figure 8:
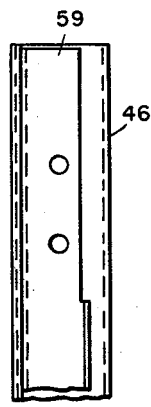
Fig. 8 is an enlarged detail view, in front elevation, of the top portion of the left-hand front upright member of the unit.
Figure 9:
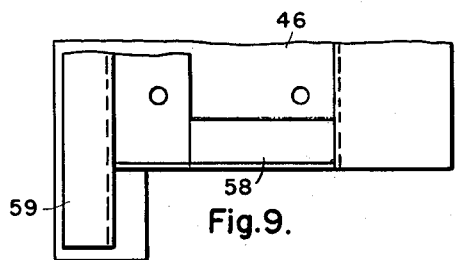
Fig. 9 is an enlarged detail view, in elevation, of the bottom portion of the left-hand upright member.
Figure 10:
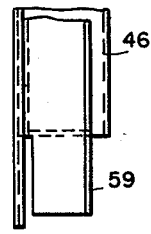
Fig. 10 is an enlarged detail view, in front elevation, of the bottom portion of the left-hand upright member.
Figure 11:
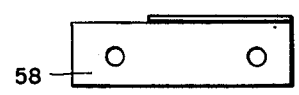
Fig. 11 is an enlarged detail view, in plan, of a plate utilized for attaching an upright member to the base.

As shown most clearly in Figs. 1, 3 and 7, a cross member 85 is provided between the upright members 46 at the front of the structure and a similar cross member is provided at the rear of the structure. The cross member 85 has a U-shaped flange 86 at its bottom, thereby providing a trough or gutter for the top flange of the door 48 at the front or the door 49 at the rear of the housing.

The cross member 85 may be attached to the Z bar 59 and by bolts 87 which are threaded into spacing members 88 welded to the back of the cross member 85. A gusset plate 89 may also be attached to the Z bar 59 by the bolts 87. The gusset plate 89 is disposed behind the flange 86 on the cross member 85 to stiffen the cross member.

In order to provide for ventilating the housing, a plurality of openings 91 are provided near the top of the cross members 85. A metal screen 92 is disposed in the space between the cross members 85 and the drip edge 73 at the front of the housing and a similar screen is disposed between the cross member 85 and the drip edge 74 at the rear of the housing. The screen may be attached to the cross member by bolts 93. In this manner air which is admitted to the housing through screens (not shown) attached to the bottom of the doors 48 and 49 is permitted to leave the housing through the openings 91 in the cross members 85 and the screens 92. The screens prevent birds or animals from entering the housing.

As shown most clearly in Figs. 1 and 3, the door 48 may be retained closed by locking bars 94 and 95 which are actuated by a handle 96 mounted on the outside of the door. The door 49 may be retained closed by similar bars 94 and 95 and a handle 96. If desired, provision may be made for locking the handles 96 in the closed position.

Figure 14:
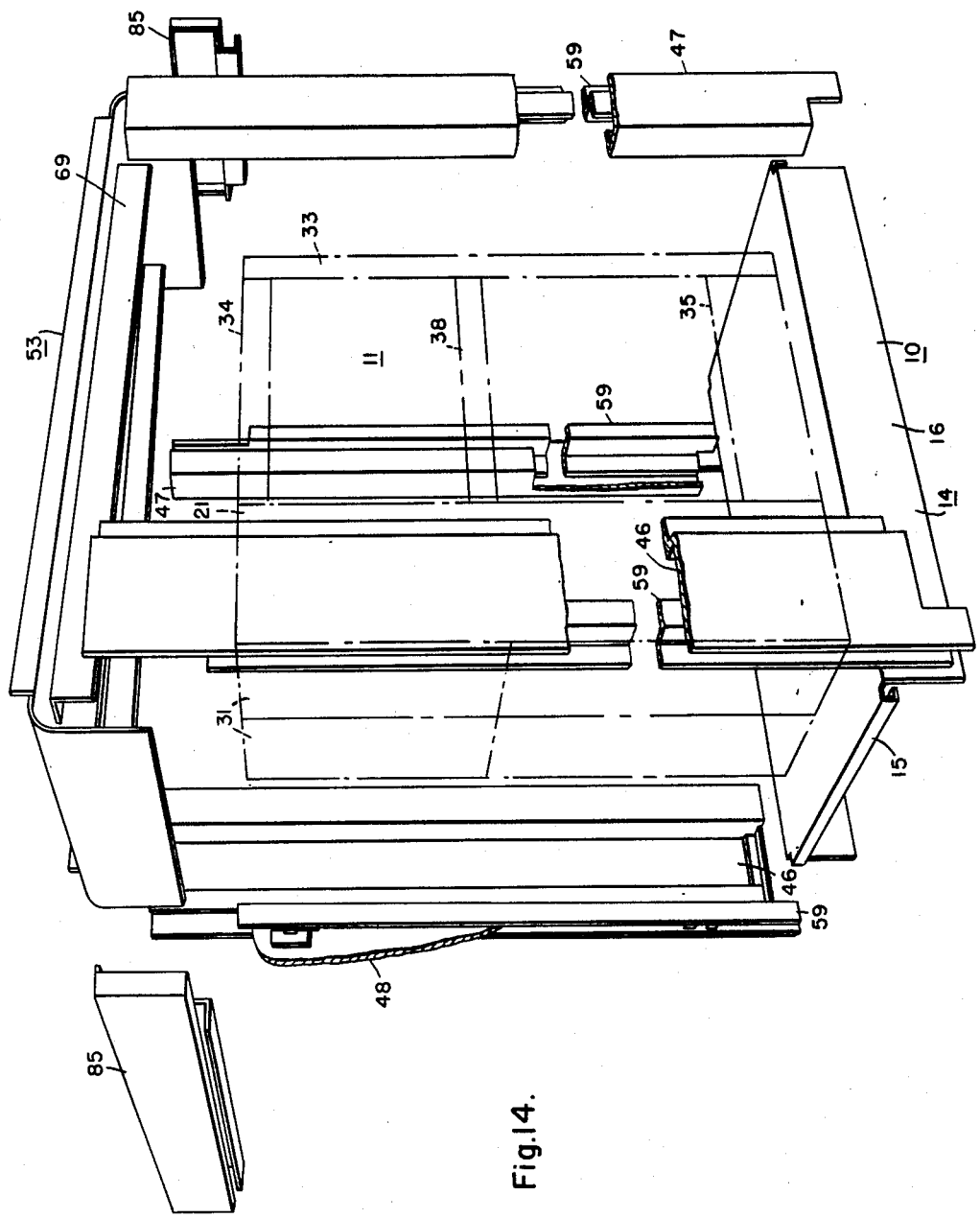
Fig. 14 is an exploded view in perspective, illustrating the manner of assembling the structure.

As illustrated in Fig. 14, the switchgear unit may be constructed by assembling the inner unit and attaching it to the base, attaching the uprights to the inner unit, tieing the uprights together at the top with the cross members and angle members and then adding the doors and the roof. The side sheets and trim members are preferably added last.

As explained hereinbefore, a plurality of switchgear units such as shown herein may be disposed side-by-side to provide any desired number of units in a switchgear installation. The bases of adjacent units may be connected together by bolts 97 which extend through the angle members 17 welded to the channel members 13 in the manner previously described. The seams between the roof sheets of the adjacent units may be sealed by the plates 75 in the manner previously described. Thus, any desired number of units may be provided in an installation, and other units may be added at any desired time.

From the foregoing description it is apparent that I have provided a metal-enclosed switchgear unit which is suitable for outdoor service and which may be constructed from standard parts which may be carried in stock by a switchgear manufacturer. A saving in the amount of material required is effected since only the main framework which supports the switchgear apparatus inside the housing is required to be of heavy gauge steel. The weatherproofing members which form the outer housing need only be strong enough to support the roof and the outer doors. Thus, the cost of constructing the unit is reduced.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A metal-enclosed switchgear unit comprising, a generally rectangular base having a flat surface, a generally cubical framework attached to said surface and having compartments therein for supporting switchgear apparatus, the cross-sectional area of said framework being less than the area of the flat surface of the base, a flanged upright member disposed at each corner of the base and extending above the main framework, each corner of the framework being set inwardly from the corresponding corner of the base by the flange on one of said upright members which is attached to the framework, a metal roof supported by the upright members above the framework, a door at the front and the rear of the unit, said doors being supported by part of the upright members, and side sheets attached to the right members, said side sheets being spaced from the framework by a distance substantially equal to the depth of the flanges on the upright members.

2. A metal-enclosed switchgear unit comprising, a generally rectangular base having a flat surface, a generally cubical framework attached to said surface and having compartments therein for supporting switchgear apparatus, the cross-sectional area of said framework being less than the area of the flat surface of the base, a generally Z-shaped upright member disposed at each front corner of the base and extending above the framework, a generally U-shaped upright member disposed at each rear corner of the base and extending above the framework, each front corner of the main framework being set inwardly from the corresponding front corner of the base by one of said Z-shaped members which is attached to said base and to the framework, each rear corner of the framework being set inwardly from the corresponding rear corner of the base by one of said U-shaped members which is attached to said base and to the framework, a metal roof spaced from the framework and supported by the upright members, a Z bar attached to each upright member and cooperating with said member to form a gutter parallel to the upright member, a door hinged on one of the Z bars at the front of the unit, another door hinged on one of the Z bars at the rear of the unit, each door having flanges disposed in said gutters when the door is closed, and side sheets attached to the upright members, said side sheets being spaced from the framework by said upright members.

3. A metal-enclosed switchgear unit comprising, a generally rectangular base having a flat surface with a notch at each corner of said surface, a generally cubical framework attached to said surface and having compartments therein for supporting switchgear apparatus, the cross-sectional area of said framework being less than the area of the flat surface of the base, a generally Z-shaped upright member having a projection disposed in the notch at each front corner of the base, a generally U-shaped upright member having a projection disposed in the notch at each rear corner of the base, said upright members extending above the framework, each front corner of the framework being set inwardly from the corresponding front corner of the base by one of said Z-shaped members which is attached to said base and to the framework, each rear corner of the framework being set inwardly from the corresponding rear corner of the base by one of said U-shaped members which is attached to said base and to the framework, a metal roof spaced from the framework and supported by the upright members, a Z bar attached to each upright member and cooperating with said member to form a gutter parallel to the upright member, a flanged door at the front and the rear of the unit, each door being hinged on one upright member and having a flange disposed in the gutter on another upright member when closed, each upright member having a double-back portion at its edge adjacent a door, and side sheets attached to the upright members, said side sheets being spaced from the framework by said upright members.

4. A metal-enclosed switchgear unit comprising, a generally rectangular base having a flat surface, a generally cubical framework attached to said surface and having compartments therein for supporting switchgear apparatus, the cross-sectional area of said framework being less than the area of the flat surface of the base, an upright member disposed at each corner of the base and extending above the framework, each upright member having an inwardly extending flange attached to the framework thereby setting each corner of the framework inwardly from the corresponding corner of the base, a metal roof spaced from the framework and supported by the upright members, a Z bar attached to each upright member and cooperating with said member to form a gutter parallel to the upright member, a cross member disposed between the upright members above the framework at the front of the unit, said cross member having a U-shaped flange to form a gutter along the bottom of the cross member, a similar cross member disposed between the upright members above the framework at the rear of the unit, a flanged door at the front and the rear of the unit, the flanges on the doors being disposed in said gutters when the doors are closed, said cross members having ventilating openings therein above the doors, and side sheets attached to the upright members, said side sheets being spaced from the framework by said upright members.

5. A metal-enclosed switchgear unit comprising, a generally rectangular base having a flat surface with a notch at each corner of said surface, a generally cubical framework attached to said surface and having compartments therein for supporting switchgear apparatus, the cross-sectional area of said framework being less than the area of the flat surface of the base, an upright member having a projection disposed in the notch at each corner of the base, said upright members extending above the framework, each upright member having an inwardly extending flange attached to the framework thereby setting each corner of the framework inwardly from the corresponding corner of the base, a metal roof spaced from the framework and supported by the upright members, a Z bar attached to each upright member and cooperating with said member to form a gutter parallel to the upright member, a cross member disposed between the upright members above the framework at the front of the unit, said cross member having a U-shaped flange to form a gutter along the bottom of the cross member, a similar cross member disposed between the upright members above the framework at the rear of the unit, a flanged door at the front and the rear of the unit, the flanges on the doors being disposed in said gutters when the doors are closed, said cross members having ventilating openings therein above the doors, each door being hinged on one upright member and closing against the Z bar on another upright member, and side sheets attached to the upright members.

6. In a metal-enclosed switchgear unit, in combination, a generally rectangular base having a flat surface with a notch at each corner of said surface, a pair of spaced vertical side plate members mounted on said surface to provide a switch compartment between the side plates, a pair of vertical frame members spaced from each other and from the rear of the side plates to provide a bus compartment at the rear of the switch compartment, horizontal frame members for connecting the vertical frame members to the side plates, an upright member having a projection disposed in the notch at each corner of the base, said upright members extending above said vertical members, each upright member having an inwardly extending flange attached to a vertical member thereby setting the vertical members inwardly from the ends and the sides of the base, a metal roof disposed above the vertical members and supported by the upright members, a switch compartment door hinged on one of said side plate members, and an outer door hinged on the upright member which is attached to and offset from the side plate member on which the compartment door is hinged, whereby said switch compartment door is free to swing through an arc greater than 90° when said outer door is opened more than 90°.

References Cited in the file of this patent

UNITED STATES PATENTS

| Number | Name | Date |
|---|---|---|
| 1,816,034 | Wood | July 28, 1931 |
| 2,061,672 | Ringel | Nov. 24, 1936 |
| 2,196,399 | Rubel | Apr. 9, 1940 |
| 2,274,106 | Strong et al. | Feb. 24, 1942 |
| 2,362,304 | Reed et al. | Nov. 7, 1944 |
| 2,480,568 | Garvin | Aug. 30, 1949 |
| 2,533,645 | Volgovskoy | Dec. 12, 1950 |
| 2,539,184 | Claybourn | Jan. 23, 1951 |
| 2,598,957 | Wolfe | June 3, 1952 |